United States Patent [19]

Weber et al.

[11] Patent Number: 5,464,228

[45] Date of Patent: * Nov. 7, 1995

[54] RESTRAINING ELEMENT FOR PRESSURE PIPE JOINTS

[75] Inventors: Joe Weber; Lawrence S. Jones, both of Birmingham, Ala.

[73] Assignee: United States Pipe and Foundry Company, Birmingham, Ala.

[ * ] Notice: The portion of the term of this patent subsequent to Mar. 22, 2011, has been disclaimed.

[21] Appl. No.: 121,631

[22] Filed: Sep. 16, 1993

Related U.S. Application Data

[63] Continuation-in-part of Ser. No. 971,110, Nov. 4, 1992, Pat. No. 5,295,697.

[51] Int. Cl.$^6$ ............................................. F16J 15/12
[52] U.S. Cl. ............ 277/207 A; 277/166; 277/181; 277/189; 285/105; 285/231
[58] Field of Search .......................... 277/166, 181, 277/189, DIG. 2, 207 A; 285/104, 105, 231, 232, 339, 340, 374, 255

[56] References Cited

U.S. PATENT DOCUMENTS

| | | | |
|---|---|---|---|
| 1,866,726 | 7/1932 | Santiago | 285/104 |
| 1,930,194 | 10/1933 | Dillon | 285/194 |
| 2,230,725 | 2/1941 | Nathan | 277/207 A X |
| 2,587,405 | 2/1952 | Steven et al. | 277/181 |
| 2,953,398 | 9/1960 | Haugen et al. | 285/110 |
| 3,724,880 | 4/1973 | Seiler | 285/105 |
| 3,733,093 | 5/1973 | Seiler | 285/342 |
| 3,963,298 | 6/1976 | Seiler | 339/95 R |
| 4,108,481 | 8/1978 | Graham | 285/231 |
| 4,119,333 | 10/1978 | Straub | 285/105 X |
| 4,229,026 | 10/1980 | Seiler | 285/105 |
| 4,593,943 | 6/1986 | Hama et al. | 285/340 |
| 4,848,805 | 7/1989 | Bucher et al. | 285/105 |
| 5,067,751 | 11/1991 | Walworth et al. | 285/105 |
| 5,094,467 | 3/1992 | Lagabe | 288/207 A |
| 5,219,189 | 6/1993 | Demoisson et al. | 285/105 |
| 5,295,697 | 3/1994 | Weber et al. | 277/207 A |

FOREIGN PATENT DOCUMENTS

| | | | |
|---|---|---|---|
| 618723 | 3/1961 | Italy | 285/104 |
| 1001248 | 7/1964 | United Kingdom . | |
| 970887 | 9/1964 | United Kingdom | 285/104 |

*Primary Examiner*—Daniel G. DePumpo
*Attorney, Agent, or Firm*—James W. Grace

[57] ABSTRACT

A restraining element for preventing separation of telescoped pipes comprising a compressible body of elastomeric material, the compressible body having metal segments spaced equidistantly around an exposed face of the body, each of the metal segments having a first exposed face with a row of teeth, at least four teeth of the row of teeth lying in an arc, and at least some of the metal segments having a single tooth extending radially outwardly beyond the face of the metal segment opposite the first exposed face.

4 Claims, 4 Drawing Sheets

RESTRAINING ELEMENT FOR PRESSURE PIPE JOINTS

This application is a continuation-in-part of application Ser. No. 07/971,110, filed Nov. 4, 1992, now U.S. Pat. No. 5,295,697.

BACKGROUND OF THE INVENTION

1. Field of the Invention

The invention is in the field of joints for ductile iron pressure pipe.

2. Description of the Prior Art

In many applications where pipes are joined in telescoping relationship, the smooth or spigot end of one pipe is inserted into the socket end of the engaging pipe. The socket end has an opening large enough to receive the spigot end of the enclosed pipe. A gasket is inserted in the socket end of tile enclosing pipe and prevents leakage of fluid from the joint by forming a seal between the two pipes.

In applications where the fluid such as water for fire mains or water distribution in municipalities is under high pressure, various means are used to prevent separation of the two pipes.

In some instances the pipes are fitted with flanges which are bolted together to prevent separation. This method is costly and time consuming because of the extra steps of inserting and tightening the bolts.

Another method to prevent separation of the pipes is to use blocks or external restraining devices. This method also is expensive and requires careful placement of the blocks.

A still further method is shown in U.S. Pat. Nos. 3,963,298 and 4,229,026 in which a rubber gasket which serves as a fluid seal also has toothed metal segments spaced uniformly around its inner perimeter. The toothed metal segments bite into the outer surface of the spigot of the inserted pipe and prevent withdrawal of the inserted pipe. The metal segments pivot about a bead to allow the spigot end of one pipe to be inserted into the socket end of the other pipe while preventing withdrawal of the inserted pipe under high fluid pressure conditions.

However, a drawback of this arrangement has been the fracture or breaking of the socketed portion of the inserted pipe when the teeth of the metal segments dig too deeply into the outer surface of the inserted pipe. This fracture has been noted when the metal segments rotate too far around the bead.

Copending application Ser. No. 07/971,110 now U.S. Pat. No. 5,295,697 discloses a restraining element having metal segments spaced equidistantly around an exposed face of the restraining element wherein each of the metal segments has a first exposed face with a row of teeth and a single tooth extending outwardly beyond the face of the metal segment opposite said first exposed face. In that application, the preferred embodiment shows a metal segment having three teeth on one exposed face. The operation of the restraining element of the copending application now U.S. Pat. No. 5,295,697 operates so that two of the teeth of the metal segment will grasp the spigot of the enclosed pipe at a preselected tolerance difference between the bell opening and the outside diameter of the spigot. However, in actual practice the difference in the distance between the lower edge of the throat portion of the bell of one pipe and the outer surface of the spigot of the enclosed pipe may vary over a wide range and the invention of the copending application may not completely and adequately compensate for these differences.

SUMMARY OF THE INVENTION

The present invention relates to an elastomeric gasket having circumferentially spaced metal segments, each metal segment having at least four teeth lying in an arc forming the inner exposed faces of the metal segments and a tooth extending outwardly of the opposite side of the metal segment. The tooth extending outwardly of the opposite side of the metal segment is adapted to dig into a wall of the socket of the enclosing pipe. The purpose of the single tooth on the outer side of the metal segment is to control the amount of rotation of the metal segment when the pipes are in a disengaging mode and to prevent the inner facing teeth from breaking the spigot of the inserted pipe. By having four teeth, the metal segment will have two teeth grasp the outer surface of the spigot end of the enclosed pipe simultaneously at all times. Thus, the pressure which the joint will withstand before separation is greatly increased.

The terms inner and outer sides of the metal segment related to the configuration of the metal segment when the elastomeric gasket is in place between the spigot and socket ends of the engaged pipes.

OBJECTS OF THE INVENTION

It is an object of the present invention to provide a gasket having metal segments with teeth to engage the spigot of a pipe, each of said metal segments also having a tooth on the side of said segment opposite said teeth to prevent excessive rotation of said metal segments.

It is another object of the invention to provide a toothed metal segment for preventing disengagement of pipes while also preventing breakage of the spigot end of one of the pipes.

It is yet another object of the present invention to provide a toothed metal segment having four teeth arranged in an arc to selectively grasp the spigot of a pipe and to increase the effectiveness of the joint against separation under a large difference in tolerances.

It is a further object of the present invention to provide a stronger joint capable of resisting higher pressures because the configuration of the invention causes the separating force to be transferred from a radial to an axial force acting along the longitudinal axis of the pipes.

BRIEF DESCRIPTION OF THE DRAWING

Other objects and advantages of the present invention will become apparent to those skilled in the art from the following description of the invention taken in conjunction with the accompanying drawing in which like numerals indicate like elements and in which.

DESCRIPTION OF THE PREFERRED EMBODIMENT

Figure 1:
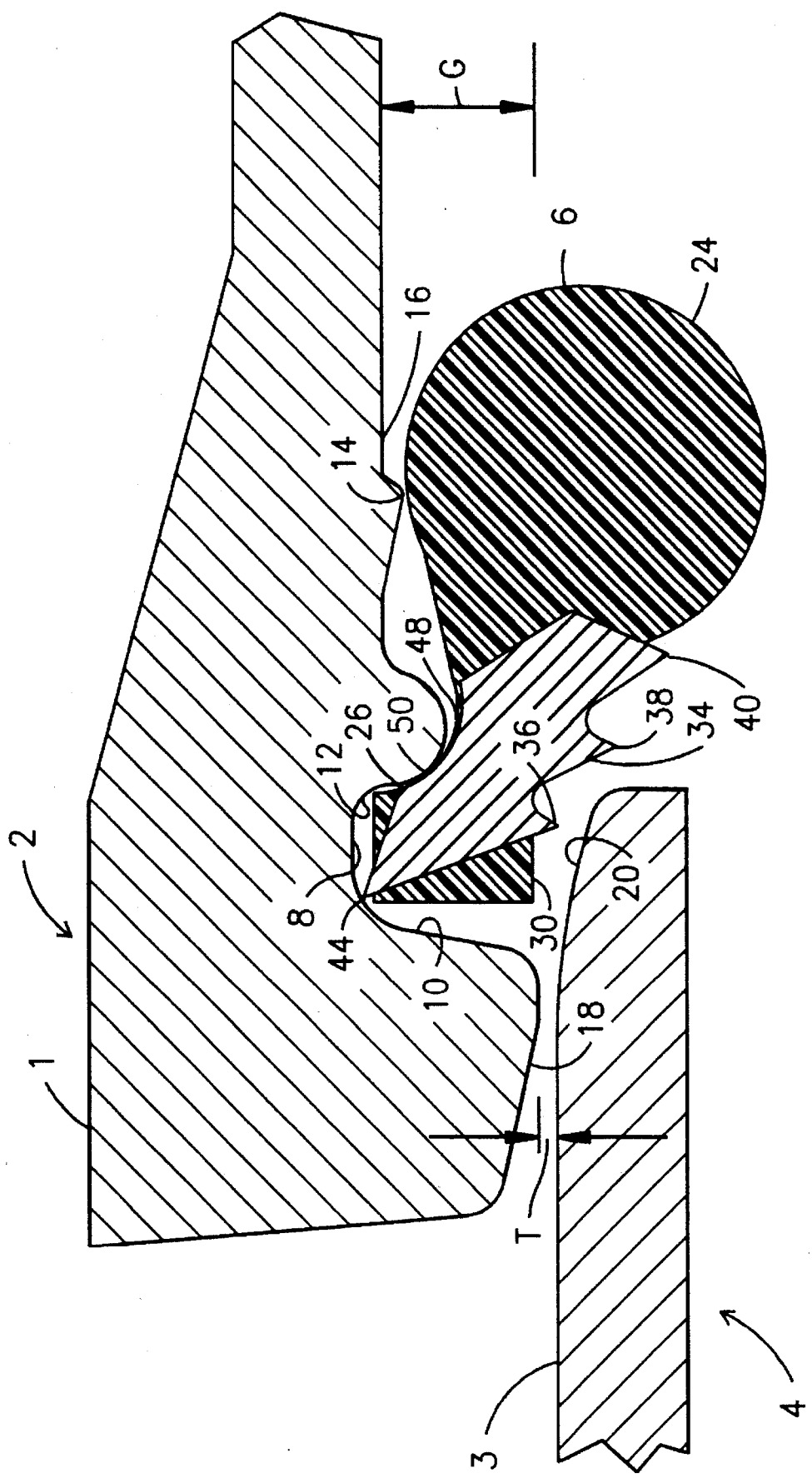
FIG. 1 is a fragmented cross-sectional view of a socket or pipe bell of one pipe using the gasket of the present invention and of a spigot or plain end of another pipe entering the pipe bell.

Cast iron pressure pipe with a bell on one end and the other plain or bevelled, have, for many years, been joined by utilizing a rubber or elastomeric gasket which is compressed between the inside walls of the bell and the outside wall of the plain or bevelled end of the next pipe in a series of telescoped pipes. The most successful of such systems provides an elongated retainer groove in the bell with a gasket sealing wall as well as throat and wall portions which guide and limit travel of the plain end as it passes through the bell opening and the rubber gasket. Such a pipe joint is described in U.S. Pat. No. 2,953,398 issued Sep. 20, 1960 and U.S. Pat. No. 4,108,481 issued Aug. 22, 1982. Gaskets of this type generally have three essential features, a sealing bulb portion, a heel portion and an inner conical wall.

Since both the pipe bell and plain end may be produced without machining, relatively large variations in as-cast diameters are encountered. The gasket sealing bulb, in turn, is subjected to a wide range of compressions from approximately 2% to 45% of its original thickness. To aid in entry of the plain end into the gasketed bell over the large range of diameters encountered, the inner wall of the gasket is generally made in a conical form which tapers from the mating throat diameter of the bell to the inner sealing bulb diameter of the gasket. To further aid in the assembly, the gasket bulb has a relatively soft Shore A durometer hardness between about 40 and 60.

The retainer heel portion of the gasket is typically produced from a higher hardness compound than the sealing bulb to aid in retention of the gasket during joint assembly and to prevent blowout of the softer bulb portion when the assembled joint is subjected to high internal pressures. The retainer heel portion of a typical gasket has a Shore A durometer hardness between about 75 to 90. The retainer heel portion is generally designed to fit into a retaining groove of the bell section of the enclosing pipe. Known gaskets exhibiting these features are asymmetric in cross-sectional profile.

Gaskets of similar asymmetric cross-sectional profiles have also been produced from single hardness rubber compounds. If the entire gasket is of the harder compound, extremely high assembly forces are required. If the entire gasket is of the softer compound, the gasket is subject to be dislodged during assembly and, in addition, only relatively low internal pressures can be held. Single hardness gaskets are, therefore, normally produced of an intermediate Shore A hardness range from between about 60 and 75. In general, with single hardness gaskets of this type, one or more of the attributes of the dual hardness gasket is diminished.

In the embodiment of the copending application now U.S. Pat. No. 5,295,697 illustrated in FIG. 1 there is shown a joint which is to be formed between a pipe bell end 1 of one pipe 2 and a plain or spigot end 3 of a second pipe 4. Second pipe 4 is to be pushed into the bell end 1 of the enclosing pipe 2. The gasket 6 is shown in place in pipe bell 1 of pipe 2.

The inner surface of pipe bell i has a retainer groove 8 bounded by a front wall 10 and retainer wall 12, and a compression rib 14 which extends radially inwardly from a sealing wall 16. In addition, the bell has a throat portion 18 which extends radially inwardly and joins the front wall 10. As the joint is assembled the throat 18 guides the plain end 3 until the bevelled end 20 contacts the conical inner face (not shown) of the gasket 6. The wedging action between the bevelled end 20 and the conical face compresses the sealing bulb portion 24 of the gasket between the plain end 3 and the compression rib 14 and the sealing wall 16. The retainer wall 12 of the bell inner surface engages the retainer shoulder 26 of the gasket to prevent the gasket from dislodging during assembly of the joint.

In tight joint conditions, the gasket space G between the sealing wall 16 and plain end 3 is relatively small and the gasket compression and joint assembly forces are relatively high. A sealing bulb 24 of gasket 6 of a relatively soft durometer elastomer is used to reduce the force required for tight joint assemblies. A harder durometer elastomer is used for the retainer heel portion 30 to prevent the gasket from dislodging during tight joint assemblies.

While the joint of the present invention is described in terms of a sealing gasket of dual durometer, the gasket may also be of single durometer.

In loose joint conditions the throat gap T between the throat 18 and the plain end 3 is relatively large. When the pipe joint is pressurized, the gasket is forced toward the front wall 10 and fills the retainer groove 8 of the pipe bell. The softer sealing bulb 24 of the gasket will attempt to extrude through the throat gap T. The harder retainer heel portion 30 of the gasket, resists the extrusion of the softer bulb portion 24 of the gasket through the throat gap T.

While the invention of the copending application has been described in the environment of a pipe joint in which the bell end of the enclosing pipe has a compression rib 14, the gasket will also perform its sealing function with a bell configuration such as that shown in U.S. Pat. No. 2,953,398 which does not have a compression rib.

Inserted into gasket 6 is a series of metal segments. 34. The segments are spaced apart equally in a circumferential direction around the periphery of gasket 6. Metal segments 34 are firmly vulcanized into gasket 6. The number of metal segments inserted into a gasket will vary depending upon the anticipated fluid pressure at the joint and the size of the pipes involved. For example, for pipes where the spigot end is 25.80" in outer diameter and the anticipated fluid pressure is 700 p.s.i., 42 metal segments are placed at a uniform distance apart around the periphery of the gasket.

The metal segment 34 of the copending application now U.S. Pat. No. 5,295,697 has three teeth 36, 38 and 40 extending beyond the heel portion 30 of gasket 6 toward the interior of the gasket. Teeth 36, 38 and 40 are designed to bite into the outer surface of spigot 3 when pipe 4 is inserted into the bell end 1 of pipe 2. Metal segment 34 is similar in design to the metal segment shown in U.S. Pat. No. 3,963, 298, except that metal segment 34 has three teeth exposed to cut into the outer surface of spigot 3 and a fourth tooth 44, which extends outwardly through the opposite side of gasket. Tooth 44 extends outwardly at the opposite or outer face of gasket 6.

The back or outer face of gasket 6 has a groove 48 lying between heel portion 30 and sealing portion 24 of gasket 6. Groove 48 receives a bead 50 of bell 1. Gasket 6 can pivot partially around bead 50 when spigot 3 is moving into or out of bell 1.

Figure 2:
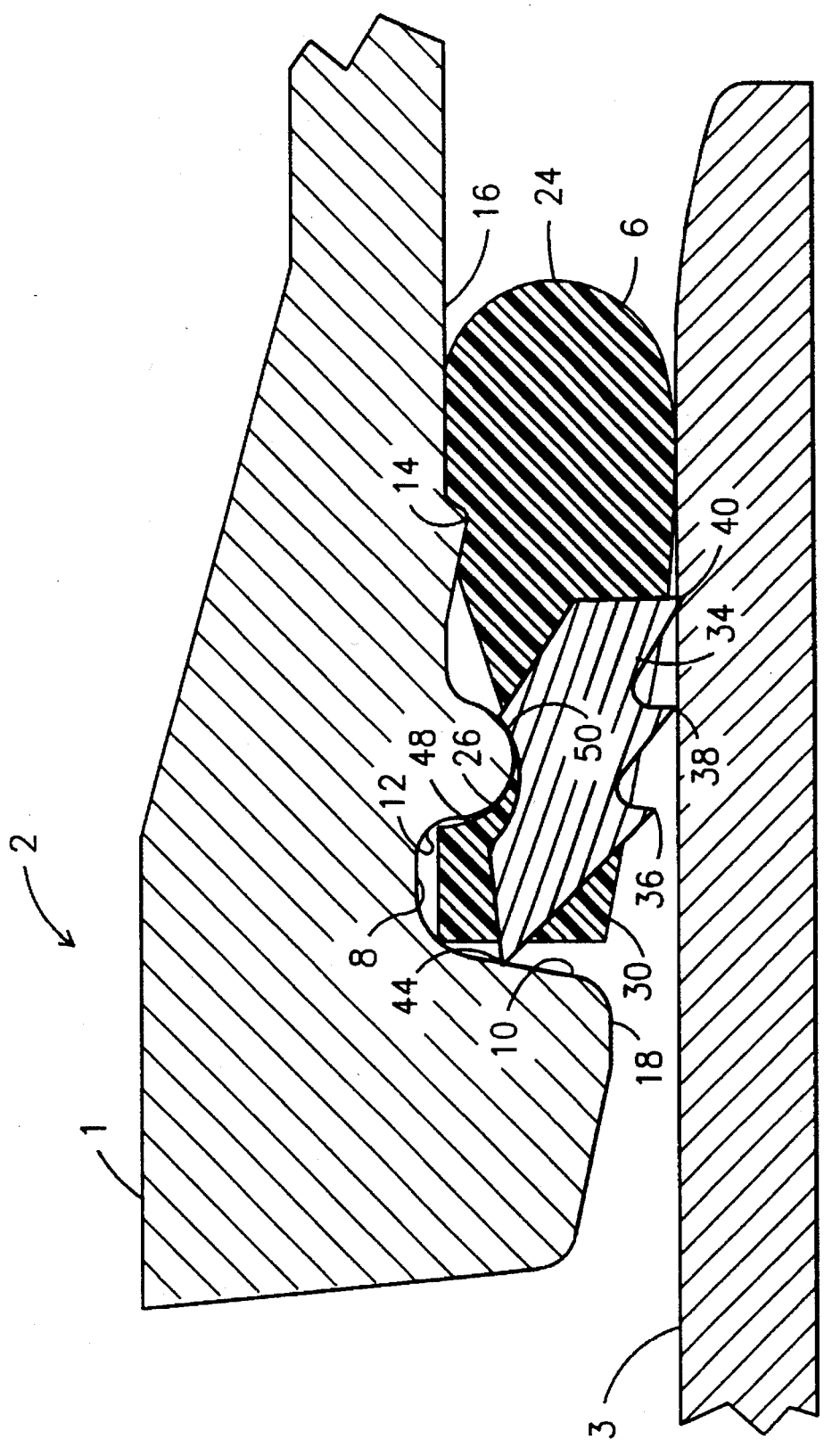
FIG. 2 is a fragmented cross-sectional view of a socket or pipe bell of one pipe using the gasket of the parent application invention and of a spigot or plain end of another pipe fully inserted to the socket end of the first pipe.

Referring now to FIG. 2, there is shown a joint completed by the full insertion of spigot 3 of pipe 4 into the bell 1 of pipe 2. As spigot 3 of pipe 4 moves into bell 1 of pipe 2 (to the right as shown in FIG. 2), the spigot 3 rides against tooth 40 of metal segment 34 and compresses sealing bulb 24 of gasket 6 to form a fluid-tight seal between the inner surface of pipe 2 and the outer surface of pipe 4. Spigot 3 also pushes against the elastomeric portion of gasket 6 between the metal segments. As spigot 3 pushes against tooth 40, metal segment 34 pivots counterclockwise around bead 50. At this time, tooth 44, which protrudes outside of the outside portion of gasket 6, rides along the inner face of front wall 10.

The joint is now sealed and fluid under pressure can be carried by the pipe system.

As the fluid pressure rises, there is a tendency for pipe 4 to move to the left and this can cause the joint to be broken. However, as pipe 4 moves to the left, tooth 40 of gasket 6 digs into the outer surface of spigot 3 as metal segment 34 tends to move to the left and to pivot clockwise around bead 50. If the metal segment 34 rotates too far around bead 50, tooth 40 will bite into the periphery of spigot 3 with enough force to break pipe 4.

To prevent the excessive rotation of metal segment 34, tooth 44, which protrudes through the rear or outer face of gasket 6, bites into the inner face of front wall 10. In preventing excessive rotation of metal segment 34, the breakage of pipe 4 is avoided.

Because back tooth 44 bites into the inner face of front wall 10, a higher internal pressure on joint separation is reached, since the separating force is transferred from a radial to an axial force acting along the longitudinal axis of the pipe.

Figure 3:
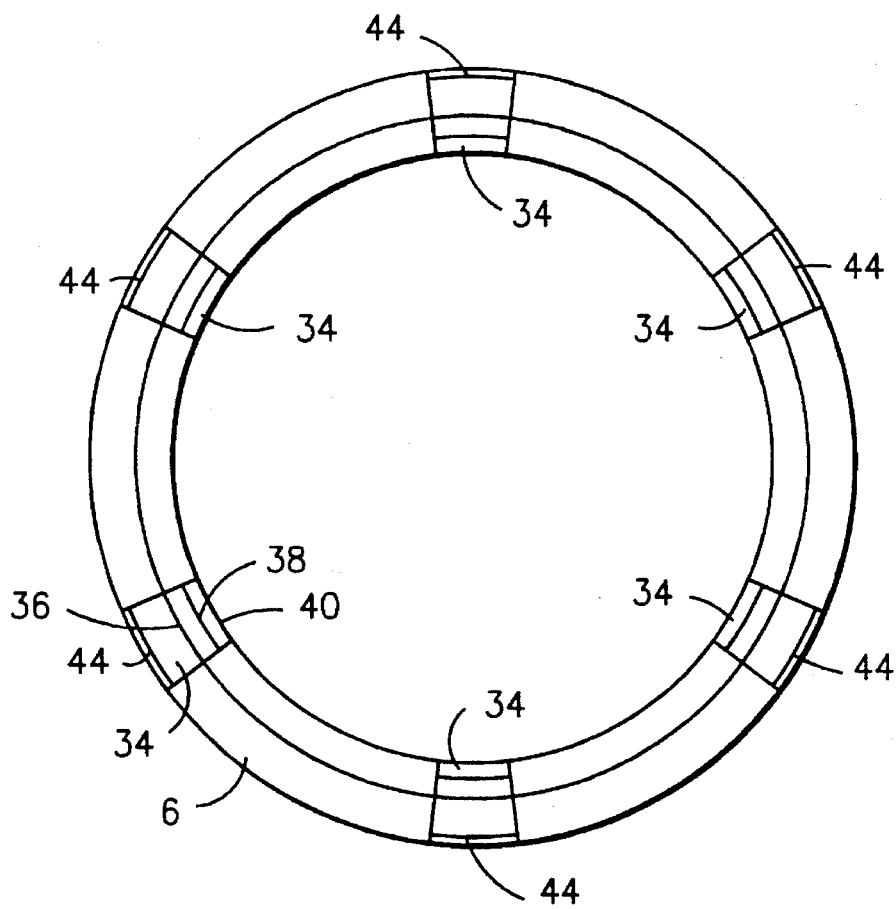
FIG. 3 is a top view of a gasket showing the placement of metal segments around its periphery.

FIG. 3 shows a gasket 6 with metal segments 34 spaced at equal distances from each other along the periphery of the gasket. It should be recognized that all of the metal segments 34 spaced around the periphery of gasket 6 operate in the same manner as that described with respect to the metal segment described in the preceding description.

The improvement constituting the present invention can now be described with regard to FIGS. 4, 5, 6, 7, and 8.

Figure 4:
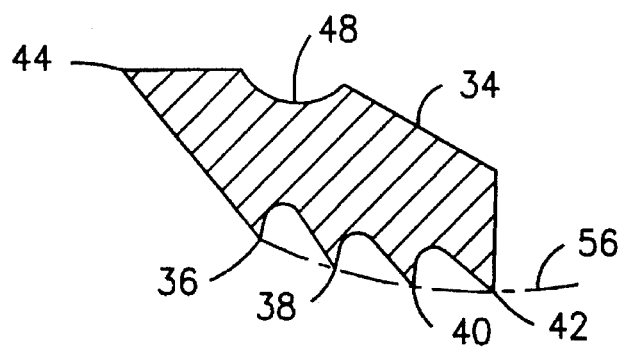
FIG. 4 is a cross-sectional view of a metal segment of the invention.

FIG. 4 shows a metal segment 34a similar to the metal segment 34 illustrated in FIG. 1 except that metal segment 34a has a fourth tooth 42. All of the teeth, 36, 38, 40, and 42, lie in a common arc 56. In this invention the arc is a segment of a circle with a radius of 0.939 inches. However, this specific dimension should not be construed as a limiting factor in the invention.

Figure 5:
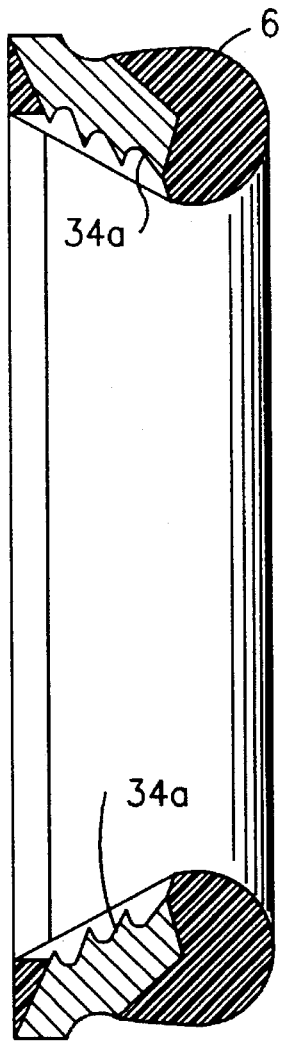
FIG. 5 is a cross-sectional view of gasket 6 showing the metal segment 34a of FIG. 4.

FIG. 5 is a cross-sectional view of gasket 6 with metal segments 34a shown in FIG. 4 embedded in the rubber ring of gasket 6.

Prior to illustrating the action of the metal segment 34a shown in FIG. 4, a short discussion of tolerances should be understood.

In the manufacture of ductile iron pipe, the outside diameter of the spigot end of the enclosed pipe will vary somewhat in size despite efforts to make a standard uniform pipe. Likewise, the bell of the enclosing pipe will vary somewhat in size also.

It is at the extreme circumstances where a spigot end of minimum diameter is inserted into the bell of a pipe with maximum diameter or where a spigot end of maximum diameter is inserted into the bell end of a pipe with minimum diameter that the difficulty of prior art metal segment 34 with three teeth occurs. With three teeth only two positions of the metal segment will occur when the pipes tend to disengage under high pressure.

To enable higher pressures with less chance of disruption, the new segment 34a with four teeth in an arc is used.

Figure 6:
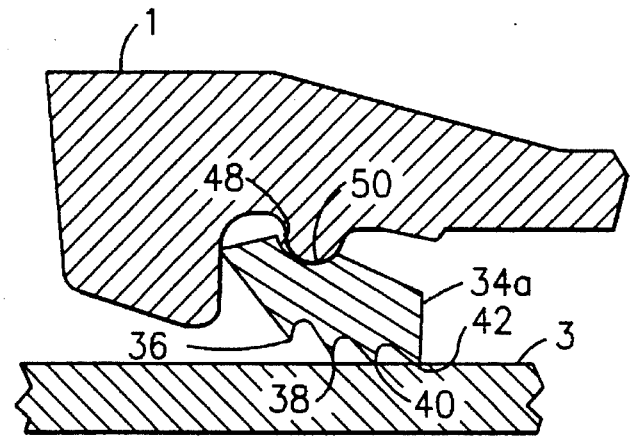
FIG. 6 is a cross-sectional view of a joint using one of the metal segments of the invention.

An example of the use of new segment 34a is shown in FIG. 6 where the tolerance between the pipes is at the extreme where the spigot of the enclosed pipe 3 has a minimum diameter and the bell of the enclosing pipe 1 has a maximum diameter. In this illustration, as the pipes tend to disengage, metal segment 34a rotates around bead 50 and teeth 40 and 42 of metal segment 34a engage the spigot end of pipe 3.

Figure 7:
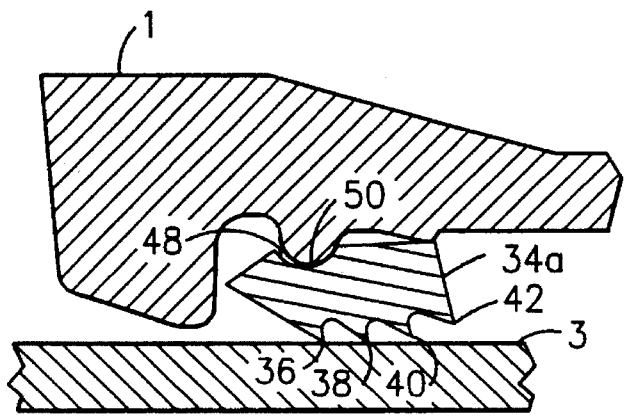
FIG. 7 is a cross-sectional view of a joint using one of the metal segments of the invention, under different conditions from those shown in FIG. 6.

As shown in FIG. 7, where the tolerance between the pipes is at the extreme where the spigot of the enclosed pipe 3 has a maximum diameter and the bell of the enclosing pipe 1 has a minimum diameter, teeth 36 and 38 of metal segment 34a will engage the spigot end of pipe 3 to prevent disengagement of the pipes.

Figure 8:
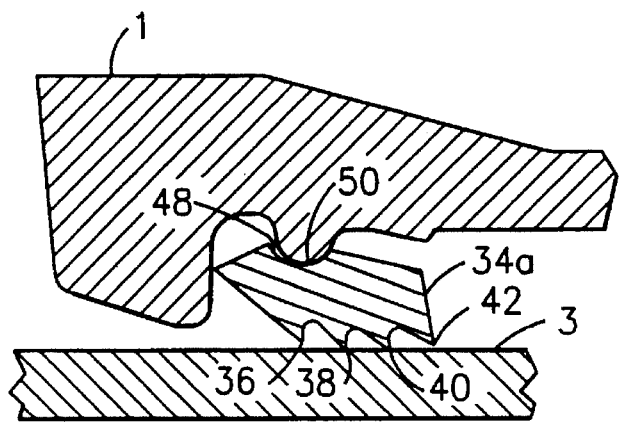
FIG. 8 is a cross-sectional view of a joint using one of the metal segments of the invention under different conditions from those shown in FIGS. 6, and 7.

As shown in FIG. 8 which is the more general case, the tolerances between the spigot end of pipe 3 and the bell of pipe 1 is more like to be an average of the two extreme cases, the middle teeth 38 and 40 of metal segment of 34a will engage the spigot end of pipe 3 when the pipes tend to disengage under high fluid pressure.

Thus, the invention is more universal in scope than other gaskets with metal segments.

In summary, the invention, by using metal segments having a tooth on its rear surface and four teeth in an arc on its opposite face has greater flexibility in preventing rupture of the spigot of an enclosed pipe.

While the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. A gasket for preventing separation of telescoped pipes, said telescoped pipes comprising a first pipe having a gasket receiving groove, said groove having a front wall, said gasket comprising a compressible body having a heel portion and a sealing portion, said heel portion having circumferentially spaced metal segments embedded in an exposed face of said body, each of said metal segments having a row of at least four teeth extending radially inwardly from a first face of said metal segment, and at least some of said metal segments having a single tooth extending radially outwardly of the side of said metal segment opposite said first face, said radially outwardly extending tooth being acutely pointed so as to bite into said front wall within said groove, said four teeth lying in an arc of a circle.

2. A gasket as recited in claim 1 in which said gasket has a heel portion having a preselected Shore hardness and said sealing portion having a Shore hardness less than said preselected Shore hardness of said heel portion.

3. A gasket as recited in claim 1 in which said heel portion and said sealing portion are of the same Shore hardness.

4. A gasket as recited in claim 1 in which each of said metal segments has a single tooth extending radially outwardly of the side of said metal segment opposite said first face.

\* \* \* \* \*